US007247319B2

(12) United States Patent
Ramstack et al.

(10) Patent No.: US 7,247,319 B2
(45) Date of Patent: Jul. 24, 2007

(54) PREPARATION OF MICROPARTICLES HAVING IMPROVED FLOWABILITY

(75) Inventors: J. Michael Ramstack, Lebanon, OH (US); Steven G. Wright, Madeira, OH (US); David A. Dickason, Cincinnati, OH (US)

(73) Assignee: Alkermes, Inc., Cambridge, MA (US)

( * ) Notice: Subject to any disclaimer, the term of this patent is extended or adjusted under 35 U.S.C. 154(b) by 760 days.

(21) Appl. No.: 10/022,859

(22) Filed: Dec. 20, 2001

(65) Prior Publication Data

US 2002/0146456 A1     Oct. 10, 2002

Related U.S. Application Data

(63) Continuation-in-part of application No. 09/748,136, filed on Dec. 27, 2000, now abandoned.

(51) Int. Cl.
*A61K 9/50* (2006.01)
(52) U.S. Cl. ...................... 424/501; 424/489
(58) Field of Classification Search ............... 424/489, 424/490, 464
See application file for complete search history.

(56) References Cited

U.S. PATENT DOCUMENTS

| | | |
|---|---|---|
| 3,523,906 A | 8/1970 | Vrancken et al. |
| 3,691,090 A | 9/1972 | Kitajima et al. |
| 3,737,337 A | 6/1973 | Schnoring et al. |
| 3,773,919 A | 11/1973 | Boswell et al. |
| 3,891,570 A | 6/1975 | Fukushima et al. |
| 3,960,757 A | 6/1976 | Morishita et al. |
| 4,221,862 A | 9/1980 | Naito et al. |
| 4,384,975 A | 5/1983 | Fong |
| 4,389,330 A | 6/1983 | Tice et al. |
| 4,530,840 A | 7/1985 | Tice et al. |
| 4,818,517 A | 4/1989 | Kwee et al. |
| 4,940,588 A | 7/1990 | Sparks et al. |
| 5,066,436 A | 11/1991 | Komen et al. |
| 5,407,609 A | 4/1995 | Tice et al. |
| 5,428,024 A | 6/1995 | Chu et al. |
| 5,478,564 A | 12/1995 | Wantier et al. |
| 5,541,172 A | 7/1996 | Labric et al. |
| 5,650,173 A | 7/1997 | Ramstack et al. |
| 5,654,008 A | 8/1997 | Herbert et al. |
| 5,654,010 A | 8/1997 | Johnson et al. |
| 5,656,297 A | 8/1997 | Bernstein et al. |
| 5,656,299 A | 8/1997 | Kino et al. |
| 5,658,593 A | 8/1997 | Orly et al. |
| 5,667,808 A | 9/1997 | Johnson et al. |
| 5,688,801 A | 11/1997 | Mesens et al. |
| 5,747,058 A | 5/1998 | Tipton et al. |
| 5,770,231 A | 6/1998 | Mesens et al. |
| 5,792,477 A | 8/1998 | Rickey et al. |
| 5,871,778 A | 2/1999 | Kino et al. |
| 5,916,598 A | 6/1999 | Rickey et al. |
| 5,942,253 A | 8/1999 | Gombotz et al. |
| 5,945,126 A | 8/1999 | Thanoo et al. |
| 5,965,168 A | 10/1999 | Mesens et al. |

FOREIGN PATENT DOCUMENTS

| | | |
|---|---|---|
| EP | 0 486 959 A1 | 5/1992 |
| EP | 0831773 | 12/1999 |
| WO | WO 89/03678 | 5/1989 |
| WO | WO 90/13361 | 11/1990 |
| WO | WO 94/10982 | 5/1994 |
| WO | WO 95/13799 | 5/1995 |
| WO | WO 96/40049 | 12/1996 |
| WO | WO 97/41837 | 11/1997 |
| WO | WO 99/12549 | 3/1999 |
| WO | WO 00/40221 A1 | 7/2000 |

OTHER PUBLICATIONS

Beck, L.R. et al., Biology of Reproduction, 28:186-195 (Feb. 1983).
Bodmeier, R., et al., International Journal of Pharmaceuticals, 43:179-186 (1988).
Y. Cha and C.G. Pitt, "The Acceleration of Degradation-COntrolled Drug Delivery from Polyester Microspheres," *Journal of Controlled Release*, 8 (1989) 259-265.
Y. Cha and C.G. Pitt, "A One-Week Subdermal Delivery System for L-Methadone Based on Biodegradable Microparticles," *Journal of Controlled Release*, 7 (1988) 69-78.
R. Jalil et al., Journal of Microencapsulation, vol. 7, No. 3, Jul.-Sep. 1990, pp. 297-319.
Wen-I Li et al., Journal of Controlled Release, 37:199-214 (Dec. 1995).
H. V. Maulding et al., "Biodegradable Microcapsules: Acceleration of Polymeric Excipient Hydrolytic Rate by Incorporation of a Basic Medicament," Journal of Controlled Release, 3:103-117 (Mar. 1986).
Hongkee Sah et al., Pharmaceutical Research, 13:360-367 (Mar. 1996).
Toyomi Sato et al., Pharmaceutical Research, 5:21-30 (1988).
Y. F. Maa et al., "Liquid-liquid emulsification by static mixers for use in microencapsulation," J. Microencapsulation, 1996, vol. 13, No. 4, 419-433.
B. Conti et al., "Use of polylactic acid for the preparation of microparticulate drug delivery systems," J Microencapsulation, 1992, vol. 9, No. 2, 153-166.
Amidon, G.E. et al., "Physical Test Methods for Powder Flow Characterization of Pharmaceutical Materials: A Review of Methods," Pharmacopeial Forum, 25(3):8298-8305 (1999).
Prescott, J.K. & Barnum, R.A., "On Powder Flowability," Pharmaceutical Technology, 60-84 (2000).
Carr, R.L., Classifying Flow Properties of Solids, Chemical Engineering, 69-72 (Feb. 1, 1965).
Carr, R.L., Evaluating Flow Properties of Solids, Chemical Engineering, 163-168 (Jan. 18, 1965).

*Primary Examiner*—Jyothsna Venkat
(74) *Attorney, Agent, or Firm*—Andrea G. Reister; Covington & Burling, LLP

(57) ABSTRACT

Methods for preparing microparticles having improved flowability to facilitate processing in automated equipment. Microparticles are conditioned so that a flowability index of the microparticles is greater than about 60. The conditioning preferably includes maintaining the microparticles at a conditioning temperature for a period of time. The conditioning can be used with microparticles containing an active agent, and with placebo microparticles, and it is reversible.

12 Claims, 5 Drawing Sheets

PREPARATION OF MICROPARTICLES HAVING IMPROVED FLOWABILITY

RELATED APPLICATIONS

The present application is a continuation-in-part of application Ser. No. 09/748,136, filed Dec. 27, 2000 now abandoned, the entirety of which is incorporated herein by reference.

BACKGROUND OF THE INVENTION

1. Field of the Invention

The present invention relates to preparation of microparticles. More particularly, the present invention relates to microparticles having improved flowability, and to a method for the preparation of such microparticles.

2. Related Art

Various methods are known by which compounds can be encapsulated in the form of microparticles. It is particularly advantageous to encapsulate a biologically active or pharmaceutically active agent within a biocompatible, biodegradable wall-forming material (e.g., a polymer) to provide sustained or delayed release of drugs or other active agents. In these methods, the material to be encapsulated (drugs or other active agents) is generally dissolved, dispersed, or emulsified in a solvent containing the wall forming material. Solvent is then removed from the microparticles to form the finished microparticle product.

An example of a conventional microencapsulation process is disclosed in U.S. Pat. No. 3,737,337 wherein a solution of a wall or shell forming polymeric material in a solvent is prepared. The solvent is only partially miscible in water. A solid or core material is dissolved or dispersed in the polymer-containing solution and, thereafter, the core-material-polymer-containing solution is dispersed in an aqueous liquid that is immiscible in the organic solvent in order to remove solvent from the microparticles.

Tice et al. in U.S. Pat. No. 4,389,330 describe the preparation of microparticles containing an active agent by using a two-step solvent removal process. In the Tice et al. process, the active agent and the polymer are dissolved in a solvent. The mixture of ingredients in the solvent is then emulsified in a continuous-phase processing medium that is immiscible with the solvent. A dispersion of microparticles containing the indicated ingredients is formed in the continuous-phase medium by mechanical agitation of the mixed materials. From this dispersion, the organic solvent can be partially removed in the first step of the solvent removal process. After the first stage, the dispersed microparticles are isolated from the continuous-phase processing medium by any convenient means of separation. Following the isolation, the remainder of the solvent in the microparticles is removed by extraction. After the remainder of the solvent has been removed from the microparticles, they are dried by exposure to air or by other conventional drying techniques.

Another conventional method of microencapsulating an agent to form a microencapsulated product is disclosed in U.S. Pat. No. 5,407,609. This method includes: (1) dissolving or otherwise dispersing one or more agents (liquids or solids) in a solvent containing one or more dissolved wall-forming materials or excipients (usually the wall-forming material or excipient is a polymer dissolved in a polymer solvent); (2) dispersing the agent/polymer-solvent mixture (the discontinuous phase) into a processing medium (the continuous phase which is preferably saturated with polymer solvent) to form an emulsion; and (3) transferring all of the emulsion immediately to a large volume of processing medium or other suitable extraction medium, to immediately extract the solvent from the microdroplets in the emulsion to form a microencapsulated product, such as microcapsules or microspheres.

U.S. Pat. No. 5,650,173 discloses a process for preparing biodegradable, biocompatible microparticles comprising a biodegradable, biocompatible polymeric binder and a biologically active agent, wherein a blend of at least two substantially non-toxic solvents, free of halogenated hydrocarbons, are used to dissolve both the agent and the polymer. The solvent blend containing the dissolved agent and polymer is dispersed in an aqueous solution to form droplets. The resulting emulsion is added to an aqueous extraction medium preferably containing at least one of the solvents of the blend, whereby the rate of extraction of each solvent is controlled, whereupon the biodegradable, biocompatible microparticles containing the biologically active agent are formed. Active agents suitable for encapsulation by this process include, but are not limited to, norethindrone, risperidone, and testosterone, and a preferred solvent blend is one comprising benzyl alcohol and ethyl acetate.

U.S. Pat. No. 5,654,008 describes a microencapsulation process that uses a static mixer. A first phase, comprising an active agent and a polymer, and a second phase are pumped through a static mixer into a quench liquid to form microparticles containing the active agent.

The documents described above all disclose methods that can be used to prepare microparticles that contain an active agent. However, flowability of these microparticles immediately after processing and recovery may be poor. Good flowability is characterized by steady, controlled flow similar to dry sand. Poor flowability, on the other hand, is characterized by uncontrolled, erratic flow similar to wet sand. In this case the entire bulk tries to move in a solid mass. This last condition is termed "floodable" flow and is most characteristic of cohesive, sticky powders. Flowability is an important consideration in large-scale processing when invariably these powders or microparticles must be moved from place to place. It is a particularly important consideration when using automated filling equipment where material must flow from a hopper. Microparticles having poor flow properties tend to "arch" or "bridge" and then may "rat hole" or stop completely when discharged from the hopper. In this case further processing must be abandoned. None of the documents discussed above discloses a specific method for preparing microparticles that have improved flowability.

Notably, none of the documents discussed above address the problems of improved flowability for microparticles containing an active agent, or for microparticles with no encapsulated active agent. Microparticles devoid of active agent may be referred to herein as "placebo microparticles." Placebo microparticles are used in clinical studies of microparticles containing an active agent, such as in blinded clinical studies. As with microparticles containing an active agent, it is important to control the flowability of placebo microparticles to process them in automated powder filling equipment. Moreover, it is preferable that the methods of manufacture and the quality characteristics of the placebo microparticles are similar to the drug-loaded microparticles to avoid noticeable differences in blinded clinical studies.

Thus, there is a need in the art for a method for preparing microparticles having improved flowability. There is a further need in the art for a method for preparing microparticles with improved flowability so that such microparticles can be processed in automated powder filling equipment. There is yet a further need in the art for preparing microparticles with improved flowability that is applicable to both microparticles containing an active agent, and to placebo microparticles. The present invention, the description of which is fully set forth below, solves the need in the art for such methods.

SUMMARY OF THE INVENTION

The present invention relates to a method for preparing microparticles that have improved flowability. In one aspect, a method for processing a quantity of microparticles is provided. The method comprises conditioning the quantity of microparticles so that a flowability index of the quantity is greater than about 60. In one aspect, the conditioning is carried out by maintaining the microparticles at a conditioning temperature for a period of time. The conditioning temperature and the period are selected so that the flowability index is greater than about 60. In a further aspect of the invention, the conditioning is carried out so that an angle of repose of the quantity of microparticles is less than about 37.

In a further aspect of the invention, the flowability of the microparticles is reversibly modified. In one aspect of the invention, the flowability of the microparticles is degraded after the conditioning step so that the flowability index of the quantity is less than about 60. Such degradation can be achieved by tumbling or otherwise mechanically agitating the microparticles or alternatively by maintaining the microparticles under vacuum for a period of about 24 hours. Alternatively, the tumbling and vacuum can be carried out sequentially or simultaneously. In another aspect of the invention, the degradation in flowability is reversed by repeating the conditioning step so that the flowability index of the quantity is again greater than about 60.

In another aspect of the present invention, a method for preparing microparticles having improved flowability is provided. The method comprises: preparing an emulsion that comprises a first phase and a second phase, the first phase comprising a polymer and a solvent for the polymer; extracting the solvent from the emulsion to form microparticles; and conditioning the microparticles so that a flowability index of the microparticles is greater than about 60.

In still a further aspect of the present invention, a method for preparing microparticles having improved flowability is provided. The method comprises: preparing an emulsion that comprises a first phase and a second phase, the first phase comprising a polymer and a solvent for the polymer; extracting the solvent from the emulsion to form microparticles; introducing the microparticles into a container; and maintaining the container at a conditioning temperature for a period of time, the conditioning temperature and the period are selected so that a flowability index of the microparticles is greater than about 60.

In yet a further aspect of the present invention, a method for preparing microparticles having improved flowability is provided. The method comprises: preparing an emulsion that comprises a first phase and a second phase, the first phase comprising a polymer and a solvent for the polymer; extracting the solvent from the emulsion to form microparticles; and hardening the microparticles so that a flowability index of the microparticles is greater than about 60. In another aspect of the present invention, the hardening step is carried out until a hardness of the microparticles is greater than about 0.4 MPa.

In yet another aspect of the present invention, microparticles having improved flowability are provided. Such microparticles may be prepared by any of the methods described and disclosed herein.

Features and Advantages

A feature of the present invention is that it provides microparticles having improved flowability. More particularly, the present invention advantageously provides microparticles having significantly improved flowability to facilitate processing in certain automated equipment, such as certain automated vial filling machines and tabletting machines.

Another feature of the method of the present invention is that it produces microparticles in stable form that should remain unchanged during normal storage conditions. Advantageously, the present invention may facilitate crystal growth of active agent on the surface of the microparticles.

A further feature of the present invention is that it can be used to increase the hardness of microparticles, and thereby improve the flowability of the microparticles. The methods of the present invention also advantageously reduce interparticle cohesion among the microparticles.

A further feature of the present invention is that it can be used with microparticles containing an active agent or other substance, as well as with placebo microparticles. As such, the processes can advantageously be used for drug-loaded microparticles and placebo microparticles in blinded clinical studies.

An advantage of the present invention is that the process can be carried out in readily available, completely closed containers eliminating the need for further processing or product transfers, thereby preserving the sterility of the microparticles. In this manner, there is no need for further sterilization.

Another advantage of the present invention is that the process can be carried out at a temperature much lower than the glass transition temperature $T_g$ of the polymer. Processing at such a temperature advantageously minimizes the product agglomeration and instability that typically occurs at temperatures nearer to or above the polymer $T_g$.

Still another advantage of the present invention is that the changes in flowability of the microparticles are reversible. The flowability of microparticles containing an active agent and of placebo microparticles can be improved or degraded with the process of the present invention, and such changes are reversible.

Poor flowability often results from conventional formulation and processing techniques for microparticles. By solving the poor flowability problem as a final processing step, the present invention advantageously avoids reformulation or redesign of established formulations, processes, and equipment.

BRIEF DESCRIPTION OF THE FIGURES

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Overview

Figure 1:
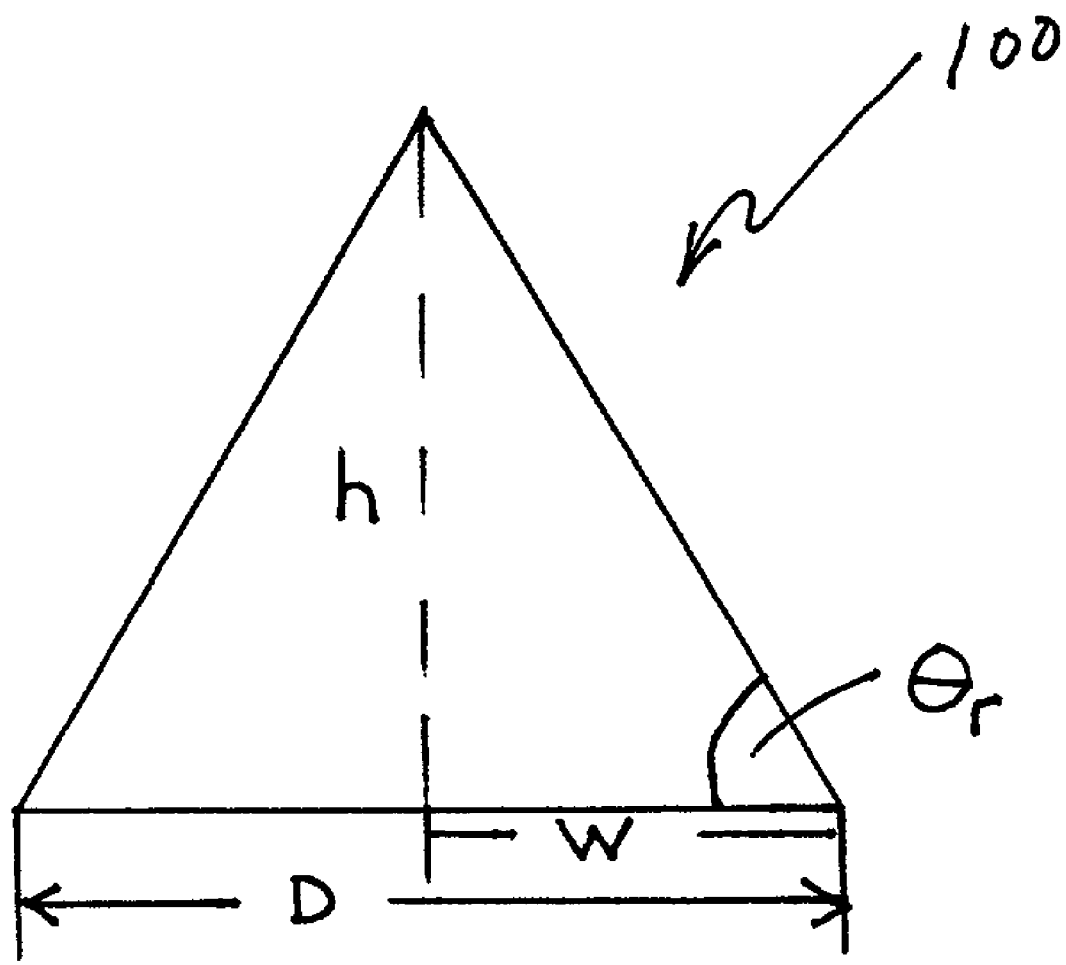
FIG. 1 depicts measurement of angle of repose for microparticles.

The present invention relates to microparticles having improved flowability, and to methods for the preparation of such microparticles. "Flowability" refers to the ability of microparticles to flow. Microparticles exhibiting poor flowability stick to one another, and "bridge" together such as when they are processed through certain automated filling equipment and hoppers. Conversely, microparticles exhibiting good flowability flow freely, and can be processed in automated filling or tabletting equipment without significant occurrence of bridging or hold-up.

The angle of repose of the microparticles can be used to characterize the flowability of the microparticles. As known to one skilled in the art, "angle of repose" refers to the limiting angle of incline, $\theta_r$, at which a body on the incline will remain at rest. For the body at rest on the incline, the frictional force f may have any value up to a maximum $\mu_s N$, where $\mu_s$ is the coefficient of static friction and N is the normal force. The angle of repose, $\theta_r$, is related to $\mu_s$ by the equation:

$$\tan\theta_r = \mu_s$$

With respect to the present invention, the angle of repose can be considered as the constant angle to the horizontal assumed by a cone-like pile of microparticles. The pile is built up by dropping the microparticles from a point above the horizontal, until a constant angle is measured.

In one embodiment of the present invention, a conditioning process is carried out on the microparticles. The conditioning process is carried out on a finished microparticle product, prior to any filling operation. It should be readily apparent to one skilled in the art, that the present invention is not limited to any particular method of preparing a finished microparticle product. For example, finished microparticles can be prepared using emulsion-based methods of preparing microparticles. Alternatively, phase separation methods can be used to prepare finished microparticles. Suitable methods of preparing a finished microparticle product are disclosed in, for example, the following U.S. Patents, the entirety of each of which is incorporated herein by reference: U.S. Pat. Nos. 3,737,337; 4,389,330; 5,019,400; 5,407,609; 5,650,173; 5,654,008; 5,792,477; 5,916,598; and 6,110,503.

In one aspect, the method of the present invention comprises placing a batch or other quantity of microparticles into a closed container. The closed container is maintained at a conditioning temperature for a period of time. The conditioning temperature and the period are selected so that a flowability index of the batch of microparticles is greater than about 60. Preferably, the closed container is rotated or inverted during the period to provide mixing, thereby reducing or eliminating any temperature gradient that may be present. After the period, the batch of microparticles can be transferred to a vial filling machine to fill vials with the microparticles, or to a tabletting machine or the like for further processing.

In one preferred embodiment of the present invention, the microparticles are made using an emulsion-based process. In such a preferred embodiment, the method of the present invention includes preparing an emulsion that comprises a first phase and a second phase. The first phase preferably comprises a polymer and a solvent for the polymer. When making microparticles containing an active agent, the first phase further comprises the active agent. The second phase is a continuous phase, preferably an aqueous phase. The solvent is extracted from the emulsion to form microparticles. The microparticles are conditioned so that a flowability index of the microparticles is greater than about 60. The conditioning is preferably carried out by maintaining the microparticles at a conditioning temperature for a period of time.

To ensure clarity of the description that follows, the following definitions are provided. By "microparticles" or "microspheres" is meant solid particles that include a polymer that serves as a matrix or binder of the particle. An active agent or other substance can be dispersed or dissolved within the polymer matrix. As used herein, the term "active agent" refers to an agent that possesses therapeutic, prophylactic, or diagnostic properties in vivo, for example, when administered to an animal, including mammals, such as humans. As used herein, the term "microparticles" is intended to include microparticles containing an active agent as well as microparticles devoid of active agent, otherwise referred to herein as "placebo microparticles." The polymer is preferably biodegradable and biocompatible. By "biodegradable" is meant a material that should degrade by bodily processes to products readily disposable by the body and should not accumulate in the body. The products of the biodegradation should also be biocompatible with the body. By "biocompatible" is meant not toxic to the body, is pharmaceutically acceptable, is not carcinogenic, and does not significantly induce inflammation in body tissues. As used herein, "body" preferably refers to the human body, but it should be understood that body can also refer to a non-human animal body. By "weight %" or "% by weight" is meant parts by weight per hundred parts total weight of microparticle. For example, 10 wt. % active agent would mean 10 parts active agent by weight and 90 parts polymer by weight. Unless otherwise indicated to the contrary, percentages (%) reported herein are by weight. By "controlled release microparticle" or "sustained release microparticle" is meant a microparticle from which an active agent or other type of substance is released as a function of time. By "mass median diameter" is meant the diameter at which half of the distribution (volume percent) has a larger diameter and half has a smaller diameter.

Methods of the Present Invention

The present invention provides a method to improve flowability of a microparticle product, preferably a microparticle comprised of an active agent and a biodegradable polymer. The flowability of the microparticle product is improved to allow processing in conventional hoppers and automated vial filling equipment. Without the method of the present invention, poor microparticle flow characteristics result in bridging in powder hoppers and subsequent inability to process the microparticle product in automated equipment.

In accordance with the present invention, a conditioning process is carried out on a finished microparticle product, such as a batch or quantity of microparticles prepared by the process disclosed and described in U.S. Pat. Nos. 5,654,008 and 5,650,173. The batch of microparticles is preferably conditioned by maintaining the batch at a conditioning temperature for a period of time. The conditioning temperature and the period are selected so that a flowability index of the batch of microparticles is greater than about 60. This conditioning process is preferably carried out at a temperature below the $T_g$ of the polymer to avoid product agglomeration. To promote crystal growth of the active agent on the surface of the microparticle (described in detail below), the conditioning process is preferably carried out in an open container so that the microparticles may be exposed to elevated humidity or moisture vapor. However, use of an open container and exposure of the microparticles to moisture vapor may compromise the sterility and stability of the final product. Therefore, to ensure sterility and stability of the microparticles, the conditioning process is carried out in a closed container with a dry product. For example, the conditioning process may be carried out in a completely closed container, which is placed in a controlled-temperature chamber. The temperature in the chamber, and the length of time the container is in the chamber, are both controlled. Preferably, the container is rotated or inverted while it is in the chamber to provide mixing. Processing the material in a closed container preserves the sterility of the microparticle product, avoids yield losses and contamination associated with handling and product transfers, and minimizes moisture pick-up by avoiding atmospheric contact.

Batches of microparticles containing risperidone were prepared at the twenty-kilogram scale using the following process. The 20 Kg process (8 kg of active agent and 12 kg of polymer) provides a theoretical drug loading of the microparticles of 40% (8 kg/20 kg×100%).

A 16.7 wt. % polymer solution was prepared by dissolving 12 kg of MEDISORB® 7525 DL polymer (Alkermes, Inc., Blue Ash, Ohio) in ethyl acetate. A 24 wt. % drug solution was prepared by dissolving 8 kg of risperidone (Janssen Pharmaceutica, Beerse, Belgium) in benzyl alcohol. An active agent/polymer solution (organic phase) was prepared by mixing the drug solution into the polymer solution. The active agent/polymer solution was maintained at a temperature of 25±5° C.

The second, continuous phase was prepared by preparing a 600 liter solution of 1% PVA, the PVA acting as an emulsifier. To this was added 42 kg of ethyl acetate to form a 6.5 wt. % solution of ethyl acetate. The two phases were combined using a static mixer such as a 1" Kenics static mixer available from Chemineer, Inc., North Andover, Mass.

The emulsion was transferred to a solvent extraction medium. The solvent extraction medium was 2.5% solution of ethyl acetate and water-for-injection (WFI) at 5-10° C. The volume of the solvent extraction medium is 0.25 L per gram of batch size.

After completion of the solvent extraction step, the microparticles were collected, de-watered, and dried. The temperature was maintained at less than about 15° C.

The microparticles were then re-slurried in a re-slurry tank using a 25% ethanol solution. The temperature in the re-slurry tank was in the range of about 0° C. to about 15° C. The microparticles were then transferred back to the solvent extraction tank for washing with another extraction medium (25% ethanol solution) that was maintained at preferably 25°±1° C.

The microparticles were collected, de-watered, and dried. The temperature was warmed to greater than about 20° C. but below 40° C.

As will be demonstrated below, the conditioning process of the present invention, wherein the microparticles are maintained at a conditioning temperature for a period of time, improves the flowability of microparticles. Table 1 below shows the effect of the conditioning process on angle of repose for samples of risperidone microparticles prepared in the manner described above.

The angle of repose was measured in the following manner. A standard 100 mm Nalgene funnel was positioned in a ring stand so that the funnel discharge was at a height of approximately three inches above a level horizontal surface. Approximately 100 g of microparticles were weighed out. The microparticles were placed in the funnel, which was fitted with a stopper to block discharge. The stopper was removed, and the microparticles were allowed to flow through the funnel until all material was discharged. The discharged microparticles formed a pile having an angle of repose characteristic of the microparticles forming the pile. A pile 100 of microparticles is depicted in FIG. 1. The height of the pile (h), the diameter of the pile (d), and the width (w) where the height of the pile was measured, were all recorded. The angle of repose was calculated from the recorded dimensions in accordance with the following formula:

$$\theta_r = \tan^{-1}\left(\frac{\text{height}(h)}{\text{width}(w)}\right)$$

$\theta_r$ is the angle of incline at which the microparticles forming pile 100 remain at rest. Microparticles that are poor flowing have a higher angle of repose (i.e., form a taller pile with greater height (h)) than microparticles that have greater flowability. Conversely, microparticles with improved flowability have a lower angle of repose (i.e., form a shorter and wider pile with lower height (h)) than microparticles having poorer flowability.

Although the diameter of the pile (d) was not needed to calculate $\theta_r$, the parameter (d) provided additional qualitative information about flowability. As can be seen from FIG. 1, if (d) is not equal to twice the width (w), then a truncated cone (pointed top of cone is truncated) has been formed. It was observed that microparticles having good flowability tended to form a truncated cone, while microparticles having poorer flowability tended to form a more defined cone with (d) substantially equal to twice the width (w).

TABLE 1

| Sample | Treatment | Angle of Repose (°) | Flow Property |
|---|---|---|---|
| (unsifted) | None | 38.7 | Poor |
| (sifted)[1] | None | 37.5 36.9 | Poor |
| (unsifted) | 24 hours @ 72° F. | 25.6 27.6 | Good |
| (sifted)[1] | 1 week @ 72° F. | 21.3 23.7 | Excellent |

[1]150 micron screen

Table 1 shows for each sample the treatment, or conditioning process, to which the sample of microparticles was subjected, the angle of repose (as measured by the process described above with respect to FIG. 1), and an assessment of the flowability or flow property. The first two samples exhibiting poor flowability were not subjected to the conditioning process of the present invention. The angle of repose for these microparticles was greater than 35°. The sample exhibiting good flowability was maintained at a conditioning temperature of 72° F. for a period of 24 hours; the angle of repose for these microparticles was between about 25.6° and about 27.6°. The flowability of the microparticles improved to excellent by maintaining the microparticles for one week at 72° F., as shown by the last sample in Table 1. The angle of repose for the last sample in Table 1 was between about 21.3° and 23.7°.

Another batch of risperidone microparticles was prepared in the manner described above. The effect of conditioning time on angle of repose for this batch of microparticles is shown below in Table 2.

TABLE 2

| Days at 20–25° C. | Angle of Repose (°) | Flow Property |
|---|---|---|
| 0 | 41.9 | Poor |
| 2 | 24.8 | Good |
| 3 | 23.2 | Good |
| 4 | 23.2 | Good |
| 5 | 21.8 | Excellent |
| 6 | 18.4 | Excellent |

Table 2 shows the angle of repose (as measured by the process described above with respect to FIG. 1) and flow property as a function of the number of days the microparticles are maintained at a conditioning temperature in the range of 20-25° C. At zero (0) days, corresponding to no conditioning process, the flowability of the microparticles was poor, and the angle of repose was about 42°. As the length of the conditioning period (days at 20-25° C.) increased, the flowability of the microparticles improved. The improved flowability is characterized by a decrease in the angle of repose.

In order to more fully characterize the microparticles exhibiting improved flowability, atomic force microscopy (AFM) micrographs were prepared for microparticles prior to the conditioning process of the present invention, and for the same microparticles after carrying out the conditioning process of the present invention. In AFM, a stylus, having a tip diameter on the order of 10-20 nm and a length of about 10μ, scans across the surface of a sample while oscillating vertically or "tapping." Deflection data of the stylus provides both geometric and compositional information about the surface of the sample.

AFM micrographs were prepared for samples of microparticles from the batches reported in Table 1 and another batch of risperidone microparticles prepared in the manner described above. One set of micrographs was prepared on "pre-conditioned" microparticles, i.e., prior to carrying out the conditioning process of the present invention. The pre-conditioned micrographs are presented in FIGS. 2A and 2B. The micrographs of FIGS. 2A and 2B exhibit large dark-phase patches 200 of what appear to be nanocrystalline or amorphous material.

Another set of micrographs was prepared on "post-conditioned" microparticles, i.e., after carrying out the conditioning process of the present invention. The post-conditioned micrographs are presented in FIGS. 3A and 3B. The micrographs of FIGS. 3A and 3B exhibit larger (up to several microns in length) and much more numerous crystals 300 than were present on the pre-conditioned micrographs of FIGS. 2A and 2B.

Figure 2A:
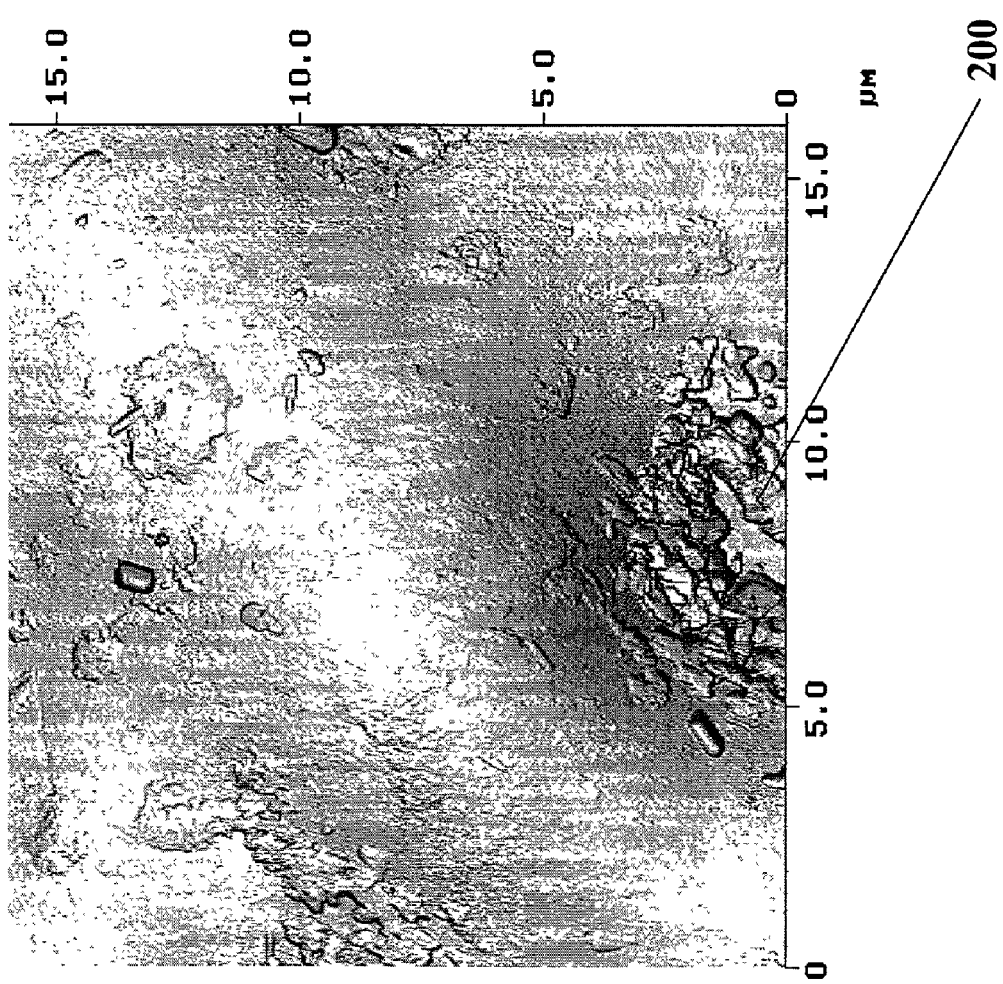
FIGS. 2A and 2B show micrographs of microparticles prior to carrying out one embodiment of a process of the present invention.
Figure 2B:
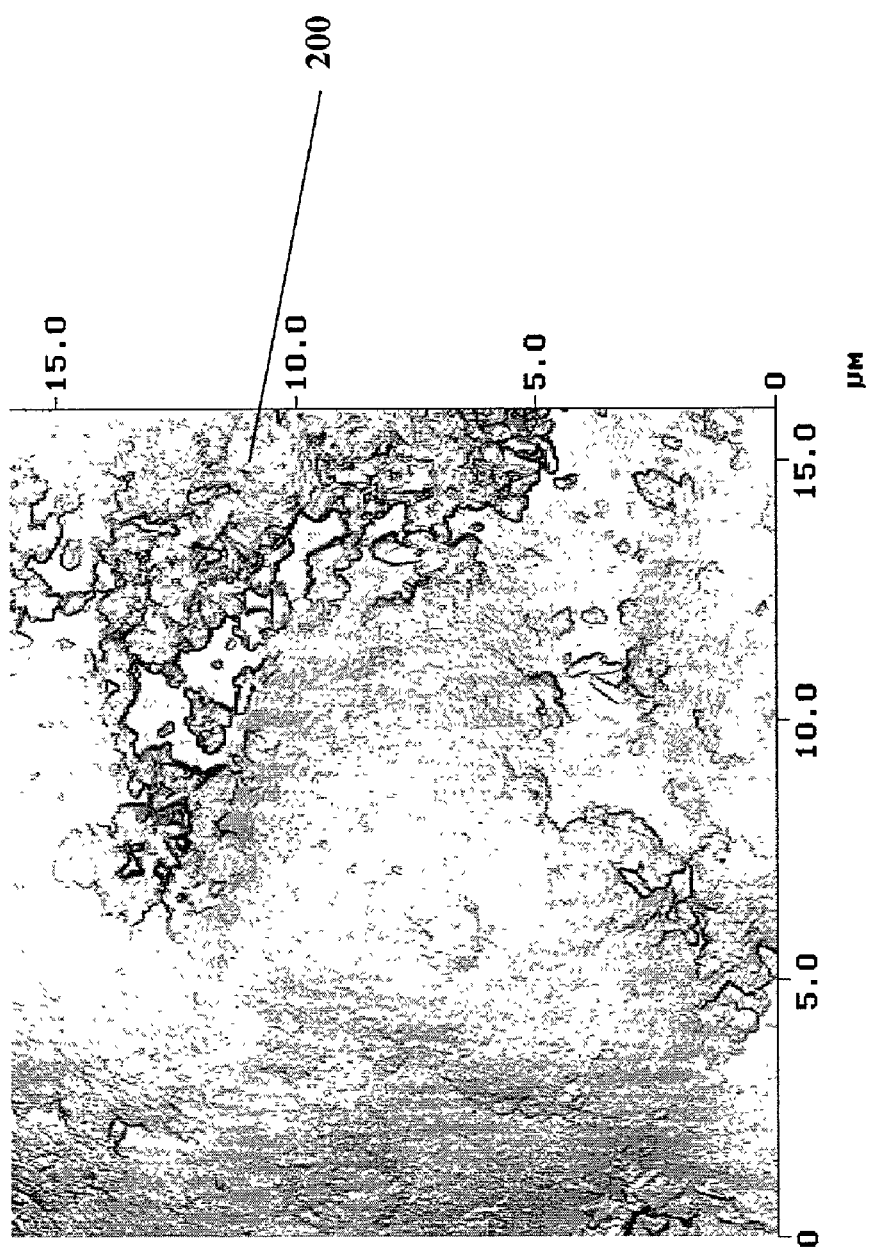
Figure 3A:
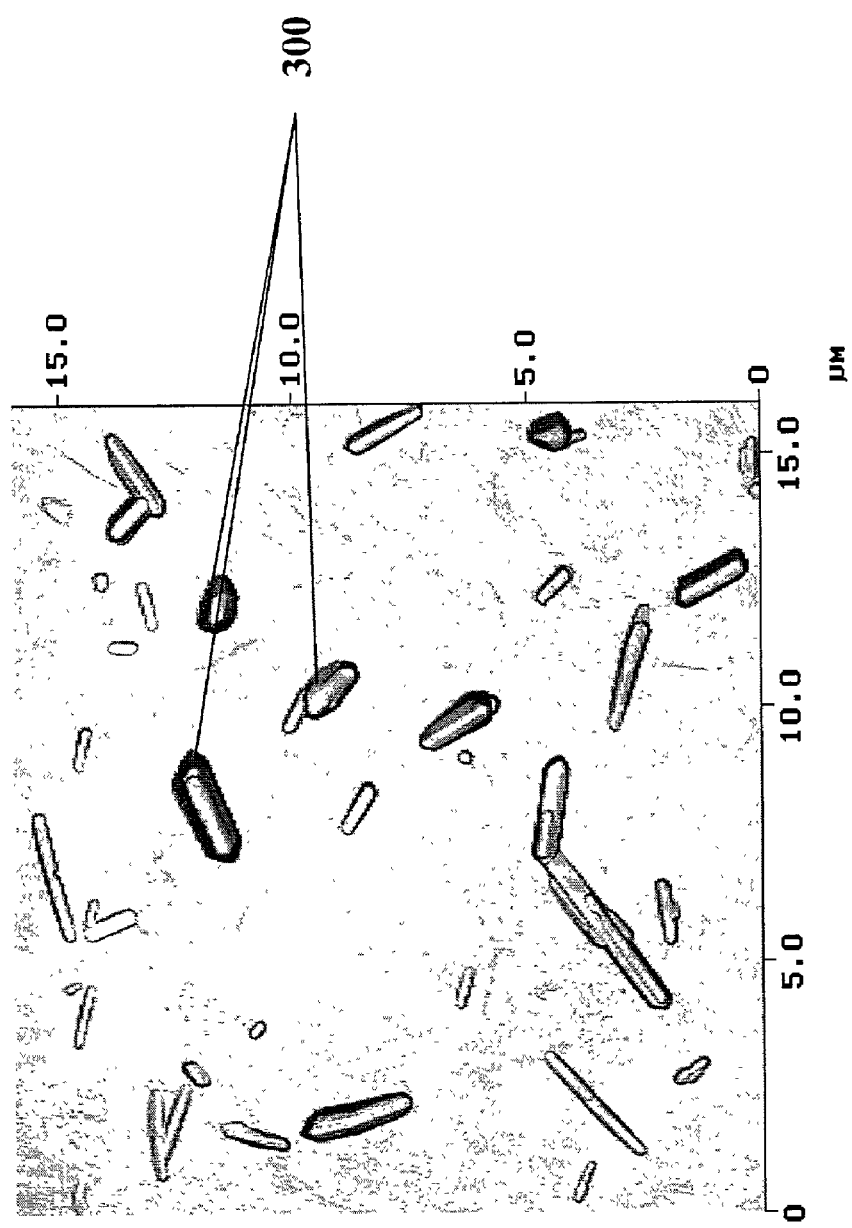
FIGS. 3A and 3B show micrographs of microparticles after carrying out one embodiment of a process of the present invention.
Figure 3B:
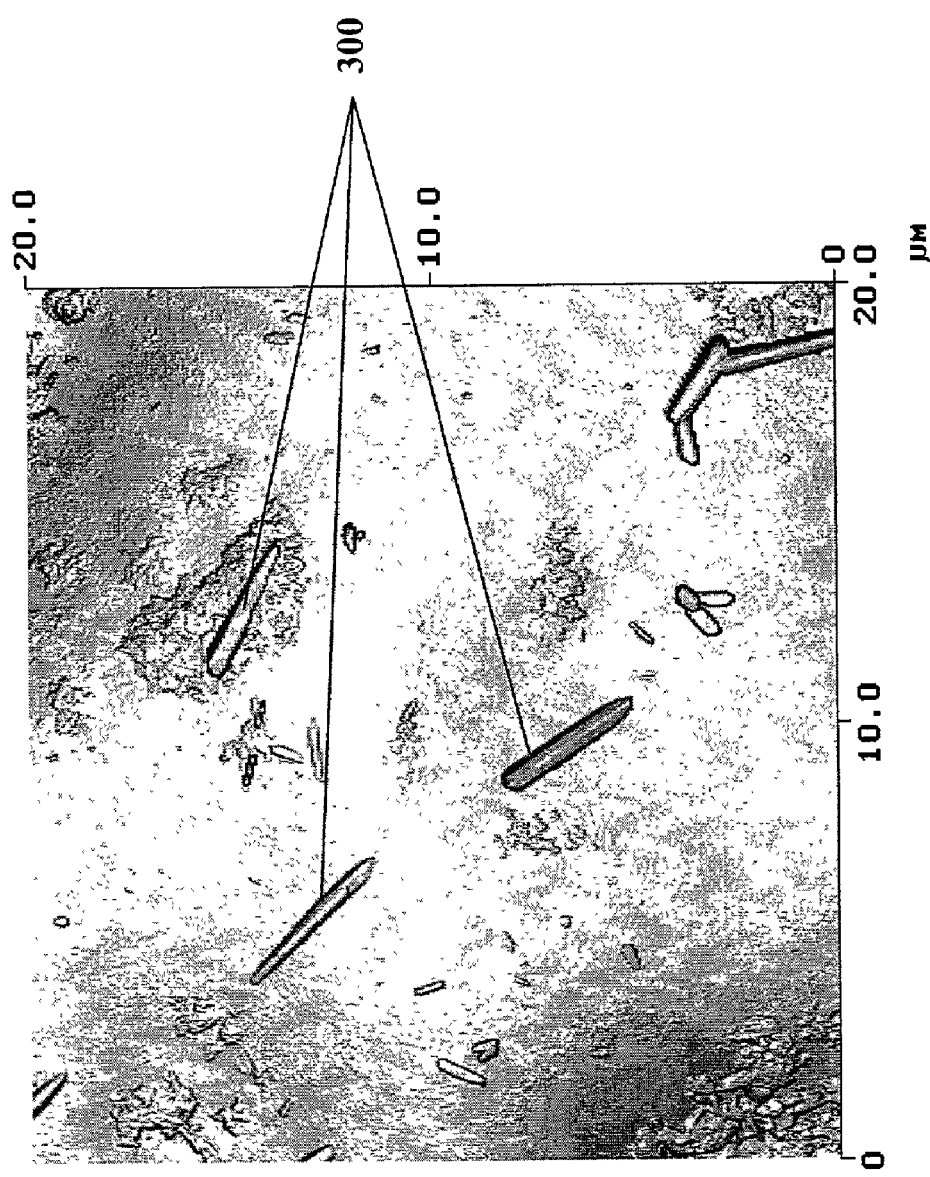

As evidenced by the pre-conditioned micrographs of FIGS. 2A and 2B, the microparticles included active agent (in this case risperidone) on the surface largely in amorphous form. As evidenced by the post-conditioned micrographs of FIGS. 3A and 3B, through the conditioning process of the present invention, the active agent on the surface of the microparticles is converted to largely crystalline form. The post-conditioned microparticles with the surface active agent in crystalline form exhibited improved flowability as discussed above. Thus, by allowing crystal growth of the active agent present on a surface of the microparticles, microparticles having improved flowability can be prepared in accordance with the present invention.

As evidenced by FIGS. 2A-3B, the crystal growth of risperidone on the surface of the microparticles occurred during the conditioning process of the present invention. The conditioning process was carried out at a conditioning temperature in the range of from about 20° C. to about 25° C. These temperatures are also much less than the polymer $T_g$ (approximately 45° C.), which is preferred since it avoids the possibility of product agglomeration.

Further tests were conducted to determine the effect of conditioning on placebo microparticles. Batches of placebo microparticles were prepared at the 20 Kg scale using a process similar to that described above for the risperidone microparticles. Flowability of the placebo microparticles was improved by conditioning the placebo microparticles by maintaining them at a conditioning temperature for a period of time. This result can be seen in Table 3, described in more detail below.

Additional testing unexpectedly revealed that the changes in flowability are reversible. Particularly, the improvements in flowability could be reversed and flowability degraded by re-processing the microparticles using mechanical action or vacuum. The degradation could then be reversed, and improved flowability restored, by re-conditioning the microparticles by maintaining them at the conditioning temperature for a period of time.

The effect of re-processing and re-conditioning on placebo microparticles, and microparticles containing an active agent, is illustrated in Table 3 below. Batches of placebo microparticles and risperidone microparticles were prepared in accordance with the 20 Kg process described above. For each batch, the treatment regime is noted, along with the angle of repose as measured by the process described above with respect to FIG. 1. As used in Table 3, "conditioned" refers to microparticles that have been maintained at a conditioning temperature for a period of time, notably maintained at 25° C. for at least five days. As can be seen from Batches A and B, re-processing by tumbling in a vibratory sieve under vacuum increased the angle of repose, thereby degrading flowability. A similar degradation in flowability can be seen from Batch C with re-processing in the vibratory sieve without vacuum. When the microparticles of Batches A and B were then re-conditioned by maintaining them at 25° C. for a period of at least five days, the angle of repose decreased, thereby improving flowability.

TABLE 3

| Batch | Treatment | Angle of Respose (deg) |
|---|---|---|
| A | Dried on sieve screen | 25.1 |
|  | Vacuum dried in vibratory sieve | 35.7 |
|  | Conditioned 5 da/25° C. | 23.7 |
| B | Conditioned | 22.7 |
|  | Re-processed in vibratory sieve w/vacuum for 2 da | 43.8 |
|  | Re-conditioned 8 da/25° C. | 32.0 |
|  | Re-conditioned 39 da/25° C. | 24.2 |
| C | Conditioned | 22.2 |
|  | Re-processed in vibratory sieve (no vacuum) for 1 da | 45.9 |
| D (Placebo) | 3 years frozen | 40.7 |
|  | Dried 15 da dry air @ 50 scfh (ambient temp.) | 41.1 |
|  | Conditioned 10 da/45° C. | 29.1 |
| E (Placebo) | 3 years @ room temperature | 19.1 |
|  | 24 hours vacuum | 26.5 |
|  | Tumbled 45k revolutions in friabilator | 31.6 |
| F | Conditioned | 19.7 |
|  | 24 hours vacuum | 24.1 |
|  | Tumbled 45k revolutions in friabilator | 34.5 |
|  | Conditioned 5 hrs/45° C. | 22.0 |
|  | Conditioned 10 da/room temperature | 20.7 |

Exposing the placebo microparticles (Batch D) to dry air at ambient temperature for 15 days was insufficient to improve flowability. However, improvement in flowability in these microparticles was observed after exposure to 45° C. for 10 days. The degradation in flowability of placebo microparticles resulting separately from vacuum and tumbling can be seen in the Batch E data in Table 3.

The degradation in flowability of active agent-containing microparticles resulting separately from vacuum and tumbling can be seen in the Batch F data in Table 3. The Batch F data also shows the subsequent improvement in flowability through re-conditioning.

Interparticle cohesion is one factor that affects bulk powder flowability. Interparticle cohesion increases with increasing thermodynamic cohesion (determined by surface energy), decreasing hardness, increasing storage stress (caking propensity), and increasing moisture affinity. A number of tests (see Table 4 below) were conducted to characterize these parameters on samples of microparticles exposed to various processing and conditioning steps.

TABLE 4

| Technique | Particle Property |
| --- | --- |
| Inverse Gas Chromatography (IGC) | Surface chemistry or cohesion energy (Wc) |
| Uniaxial Compaction | Hardness or rigidity |
| Dilatometry | Thermal softening temp (max. storage temp) |
| Moisture Adsorption/Desorption | Moisture interaction |

Dilatometry tests produced thermal softening temperatures similar to the respective sample glass transition temperatures (Tg's). Since storage is conducted at temperatures well below these temperatures, storage stress does not appear to be a factor affecting flowability.

Inverse Gas Chromatography (IGC) relies upon the same physical principles as standard gas chromatography. However, in IGC the stationary phase is a column packed with the powder of interest. The mobile phase comprises probe gas molecules that move through the packed column and adsorb to and desorb from the powder. The rate and degree of the adsorption/desorption is determined by the surface density of the probe gas molecules and the powder. The surface chemistry (surface energies) of the powder can be calculated since the surface chemistry of the probe molecules is known.

Uniaxial compaction determines particle mechanical properties, including hardness. Compressibility measurements were conducted via uniaxial compaction. An axial stress was applied at a specified rate to a compaction cell containing the microparticles. As stress is increased, the sample settles, densities, and eventually yields and compacts through particle deformation or fracture. Once the stress is removed, the sample recovers (or "springs back") partially. The degree to which recovery occurs is dependent on the elastic/plastic properties of the material. Through compaction analysis of the stress-strain response, the elastic/plastic characteristics of the material may be calculated in terms of the mechanical properties such as yield stress, hardness, strength and rigidity.

Dilatometry is the primary measurement that is used to evaluate caking propensity by measuring mechanical and physical properties of a powder under fixed environmental conditions. One type of dilatometry is Conditioned or Caking Dilatometry that is used to identify critical limits of combined temperature and humidity that prevent sample compaction and caking. This type of dilatometry is generally conducted as a thermal cycle at a specified humidity level that correlates with typical storage conditions. A second type of dilatometry is Constant Heating Rate (CHR) dilatometry. CHR dilatometry is used to determine a powder's thermal softening characteristics, and a maximum storage temperature. The sample should be stored at a temperature below the "sintering temperature," the temperature at which the powder begins to exhibit softening characteristics. As known to one skilled in the art, a dilatometer including a sample cell with the powder of interest can be used to determine the sintering temperature.

Weight changes in small mg samples can be used to measure moisture adsorption/desorption. For example, a Kohn type electrobalance can be used to measure weight changes in the powder sample as it is subjected to 5% step changes in relative humidity (RH). The weight change can be monitored for adsorption up to 95% RH, followed by desorption, to produce an adsorption/desorption cycle from 5 up to 95% RH.

Table 5 below shows the results of characterizations of particle hardness, surface work of cohesion (Wc) and moisture isotherms for four batches of microparticles prepared in accordance with the process described above. Particle hardness results correlated well with relative flowability across the entire sample range, increasing with improved flowability. Not as strongly correlating with flowability, Wc tended to decrease with increased flowability. The moisture adsorption/desorption isotherm results were non-remarkable across the majority of the samples. However, a large hysteresis was observed in the pre-conditioned sample (Batch II).

TABLE 5

| Batch Treatment | I (Placebo) Pre-conditioned[1] | II Pre-conditioned | Conditioned[2] | III Conditioned | Re-processed (2 days)[3] | IV Re-processed (1 day)[4] |
| --- | --- | --- | --- | --- | --- | --- |
| Observed Flowability | Worst: sticks to surfaces | 2nd worst: significant caking | 2nd best: significant caking | Best | Bad | Bad |
| Work of Cohesion, Wc (dyne/cm) | 379 | 291 | 207 | 253 | 245 | 300 |
| Particle Hardness, H (MPa) | 0.24 | 0.28 | 0.41 | 0.55 | 0.26 | 0.22 |
| Normalized Cohesion (Wc/H) (dyne/cm MPa) | 1547 | 1048 | 511 | 459 | 933 | 1390 |

TABLE 5-continued

| Batch Treatment | I (Placebo) Pre-conditioned[1] | II Pre-conditioned | Conditioned[2] | III Conditioned | Re-processed (2 days)[3] | IV Re-processed (1 day)[4] |
|---|---|---|---|---|---|---|
| Moisture Isotherm Hysteresis | None | Large | Small | Small | Small | Small |

[1] Material freshly discharged from the drier and kept frozen (−16° C.)
[2] Material exposed to greater than 5 days at 25° C.
[3] Conditioned material exposed to 2 days of vibratory sieving with vacuum
[4] Conditioned material exposed to 1 day of vibratory sieving without vacuum From this study it appears that the conditioning process serves to harden the surfaces of the microparticles. By hardening the microparticles, flowability was improved. As shown in Table 5, microparticles having a hardness greater than about 0.4 MPa exhibited the best flowability. Physical (vacuum and mechanical action) processes serve to reverse the effects of conditioning, presumably by causing the production of a defective surface.

As shown and described in more detail below, the same general observations were noted for placebo microparticles as for active agent-containing microparticles. As such, it is highly likely that the hardening/softening observations are related to the arrangement of polymer chains on the microparticle surface. Conditioning may serve as an annealing process resulting in a more relaxed polymer chain arrangement, resulting in harder and less cohesive microparticles. Mechanical action may serve to disrupt this arrangement.

Wc (defined as the thermodynamic work required to separate two particles) was significantly higher for the placebo (Batch I) compared to the drug-loaded batches. Among the drug-loaded batches, Wc decreased during conditioning (Batch II). Additionally, a large adsorption isotherm hysteresis was observed in the pre-conditioned sample (Batch II) that all but disappeared after conditioning. This observation is consistent with a change in surface drug form and agrees with earlier observations of surface drug crystal growth during conditioning.

Based on these results, it appears that the polymer surface alone may impart a high surface energy that becomes masked or decreases with the presence of drug. Additionally, as the surface drug form changes from amorphous (or semi-crystalline) to predominantly crystalline, surface energy again decreases. Reprocessing does not significantly affect Wc, which is likely, since drug form changes are complete and not expected to be affected by the re-processing by vacuum and/or mechanical action.

Based on these results, the increase in flowability could be attributed principally to increases in particle hardness and to a secondary extent to decreases in work of cohesion. As seen in Table 5, a normalized cohesion parameter (Wc divided by particle hardness) representing bulk interparticle cohesion was found to correlate well with bulk flowability.

The angle of repose is one parameter that can be used to characterize flowability. As reported in R. L. Carr, "Evaluating Flow Properties of Solids," CHEMICAL ENGINEERING, Jan. 18, 1965, pp. 163-168; and R. L. Carr, "Classifying Flow Properties of Solids," CHEMICAL ENGINEERING, Feb. 1, 1965, pp. 69-72 (the entirety of each of which being incorporated herein by reference), the evaluation of the flow characteristics of a dry powder involves the use of four properties: (1) angle of repose; (2) angle of spatula; (3) compressibility; and (4) cohesion. As known to one skilled in the art, the foregoing four parameters may be referred to as the "Carr Parameters." The angle of spatula is defined as the angle formed when material is raised on a flat surface out of a bulk pile. The angle of spatula gives a relative angle of internal friction or angle of rupture for a dry material. Compressibility is calculated from measurements of loose and trapped bulk density. Percentage compressibility is computed from the following formula:

$$\% \text{ Compressibility} = 100 \, (P-A)/P$$

where P=packed bulk density and A=aerated bulk density. Cohesion refers to the amount of energy necessary to pull apart aggregates of cohesive particles in a specified time. Cohesion can be determined by vibrating the powder material through sieve screens and determining the weight percent of material left on each screen.

Each of the four Carr Parameters can then be converted to an index through the use of a point score. One example of a point score conversion table is shown below as Table 6. The value of each Carr Parameter is converted to a point value, and the point values of the four parameters are summed to yield a flowability index. For example, the following measured values of the Carr Parameters are converted to a flowability index of 65.5 through the use of the point scores in Table 6.

TABLE 6

| Flowability & Performance | | Angle of Repose | | Compressibility | | Angle of Spatula | | Cohesion | |
|---|---|---|---|---|---|---|---|---|---|
| Rating | Total Points | Deg. | Points | % | Points | Deg. | Points | % | Points |
| Excellent (aid not needed, will not arch) | 90–100 | 25 | 25 | 5 | 25 | 25 | 25 | | |
| | | 26–29 | 24 | 6–9 | 23 | 26–30 | 24 | | |
| | | 30 | 22.5 | 10 | 22.5 | 31 | 22.5 | | |
| Good (aid not needed, will not arch) | 80–89 | 31 | 22 | 11 | 22 | 32 | 22 | | |
| | | 32–34 | 21 | 12–14 | 21 | 33–37 | 21 | | |
| | | 35 | 20 | 15 | 20 | 38 | 20 | | |

TABLE 6-continued

Flowability & Performance

| Rating | Total Points | Angle of Repose Deg. | Points | Compressibility % | Points | Angle of Spatula Deg. | Points | Cohesion % | Points |
|---|---|---|---|---|---|---|---|---|---|
| Fair (aid not needed, but vibrate if necessary) | 70–79 | 36 | 19.5 | 16 | 19.5 | 39 | 19.5 | | |
| | | 37–39 | 18 | 17–19 | 18 | 40–44 | 18 | | |
| | | 40 | 17.5 | 20 | 17.5 | 45 | 17.5 | | |
| Passable (borderline, material may hang up) | 60–69 | 41 | 17 | 21 | 17 | 46 | 17 | | |
| | | 42–44 | 16 | 22–24 | 16 | 47–59 | 16 | | |
| | | 45 | 15 | 25 | 15 | 60 | 15 | <6 | 15 |
| Poor (must agitate, vibrate) | 40–59 | 46 | 14.5 | 26 | 14.5 | 61 | 14.5 | 6–9 | 14.5 |
| | | 47–54 | 12 | 27–30 | 12 | 62–74 | 12 | 10–29 | 12 |
| | | 55 | 10 | 31 | 10 | 75 | 10 | 30 | 10 |
| Very Poor (agitate more positively) | 20–39 | 56 | 9.5 | 32 | 9.5 | 76 | 9.5 | 31 | 9.5 |
| | | 57–64 | 7 | 33–36 | 7 | 77–89 | 7 | 32–54 | 7 |
| | | 65 | 5 | 37 | 5 | 90 | 5 | 55 | 5 |
| Very, Very Poor (special agit., hopper or eng'g.) | 0–19 | 66 | 4.5 | 38 | 4.5 | 91 | 4.5 | 56 | 4.5 |
| | | 67–89 | 2 | 39–45 | 2 | 92–99 | 2 | 51–79 | 2 |
| | | 90 | 0 | >45 | 0 | >99 | 0 | >79 | 0 |

| Carr Parameter | Measured Value | Point Score |
|---|---|---|
| Angle of Repose | 37.3° | 18 |
| Angle of Spatula | 51.3° | 16 |
| Compressibility | 15.6% | 19.5 |
| Cohesion | 19.4% | 12 |
| Total Points = Flowability Index = | | 65.5 |

A powder characteristics tester can be used to measure the Carr Parameters and to compute the flowability index. One such powder characteristics tester is the Model PT-N Powder Characteristics Tester, available from Hosokawa Micron Powder Systems, Summit, N.J. The PT-N provides seven mechanical measurements (angle of repose, compressibility, angle of spatula, cohesiveness, angle of fall, dispersability, and angle of difference) and three supporting measurements (aerated bulk density, packed bulk density, and uniformity) of dry powder samples. The PT-N includes a microcomputer that includes programming for calculating the index or point score for each Carr Parameter, as well as for calculating the overall flowability index.

The effect of conditioning and re-processing on flowability, the Carr Parameters, and the polymer glass transition temperature Tg can be seen below in Table 7. The flow time, four Carr Parameters, flowability index, and Tg are shown for four batches of conditioned and re-processed microparticles. Batch I was placebo microparticles; the remaining batches were risperidone microparticles. The conditioned microparticles were maintained at 25° C. for a period of at least five days. The re-processed microparticles were exposed to vibrating sieving under vacuum for 24 hours. The Carr Parameters and the flowability index were measured with the Model PT-N Powder Characteristics Tester described above.

TABLE 7

| Batch | Description | Flow Time (sec)[1] | Carr Parameters[4] | | | | Flowability Index[4] | Tg (° C.) | Enthalpic Relaxation (J/g) |
| | | | Angle of Repose (degrees) | Angle of Spatula (degrees) | Compressibility (%) | Cohesion (%) | | | |
|---|---|---|---|---|---|---|---|---|---|
| G | Conditioned[2] | 12.5 | 37.3 | 51.3 | 15.6 | 19.4 | 65.5 | 42.1 | 1.83 |
| | Re-processed[3] | 24.2 | 46.4 | 70.5 | 19.5 | 34.5 | 51.0 | 45.2 | 1.61 |
| H | Conditioned | 11.3 | 32.7 | 61.0 | 16.1 | 24.9 | 67.0 | 45.3 | 2.08 |
| | Re-processed | 12.2 | 39.7 | 63.9 | 15.7 | 18.9 | 61.0 | 45.6 | 1.63 |
| I (placebo) | Conditioned | 13.1 | 33.5 | 66.9 | 16.3 | 19.9 | 64.5 | 51.8 | 9.47 |
| | Re-processed | 15.6 | 42.8 | 70.7 | 26.0 | 31.5 | 49.5 | 51.5 | 8.26 |
| J | Conditioned | 10.7 | 33.9 | 60.1 | 15.1 | 24.5 | 68.0 | 44.1 | 2.29 |
| | Re-processed | >300 | 49.0 | 76.0 | 24.0 | 79.2 | 39.5 | 41.0 | 1.29 |

[1]Measured with PharmaTest Powder Testing System
[2]Material exposed to greater than 5 days at 25° C.
[3]Material exposed to vibratory sieving with vacuum for 24 hours
[4]Measured with Hosokawa Powder Tester (PT-N)

As can be seen from Table 7, the conditioned microparticles had an angle of repose less than about 37°. The flowability index was found to be a good prediction of bulk material flow. Acceptable microparticle flowability occurred when the flowability index was greater than about 60. Polymer glass transition was also measured in these samples using modulated differential scanning calorimetry. Although the glass transition temperature (Tg) varied little, the enthalpy of relaxation (J/g) decreased significantly with re-processing. These data support the theory that hardness is related to the arrangement of polymer surface chains. The polymer chains in the conditioned microparticles are in a more relaxed state, which is reflected in the higher enthalpy of relaxation. The polymer chains in the re-processed microparticles are less relaxed, which is reflected in a lower enthalpy of relaxation.

Preferred active agents that can be encapsulated by the process of the present invention include 1,2-benzazoles, more particularly, 3-piperidinyl-substituted 1,2-benzisoxazoles and 1,2-benzisothiazoles. The most preferred active agents of this kind for treatment by the process of the present invention are 3-[2-[4-(6-fluoro-1,2-benzisoxazol-3-yl)-1-piperidinyl]ethyl]-6,7,8,9-tetrahydro-2-methyl-4H-pyrido[1,2-a]pyrimidin-4-one ("risperidone") and 3-[2-[4-(6-fluro-1,2-benzisoxazol-3-yl)-1-piperidinyl]ethyl]-6,7,8,9-tetrahydro-9-hydroxy-2-methyl-4H-pyrido[1,2-a]pyrimidin-4-one ("9-hydroxyrisperidone") and the pharmaceutically acceptable salts thereof. Risperidone (which term, as used herein, is intended to include its pharmaceutically acceptable salts) is most preferred. Risperidone can be prepared in accordance with the teachings of U.S. Pat. No. 4,804,663, the entirety of which is incorporated herein by reference. 9-hydroxyrisperidone can be prepared in accordance with the teachings of U.S. Pat. No. 5,158,952, the entirety of which is incorporated herein by reference.

Preferred examples of polymer matrix materials include poly(glycolic acid), poly(d,l-lactic acid), poly(l-lactic acid), copolymers of the foregoing, and the like. Various commercially available poly(lactide-co-glycolide) materials (PLGA) may be used in the method of the present invention. For example, poly (d,l-lactic-co-glycolic acid) is commercially available from Alkermes, Inc. (Blue Ash, Ohio). A suitable product commercially available from Alkermes, Inc. is a 50:50 poly(d,l-lactic-co-glycolic acid) known as MEDISORB® 5050 DL. This product has a mole percent composition of 50% lactide and 50% glycolide. Other suitable commercially available products are MEDISORB® 6535 DL, 7525 DL, 8515 DL and poly(d,l-lactic acid) (100 DL). Poly(lactide-co-glycolides) are also commercially available from Boehringer Ingelheim (Germany) under its Resomer® mark, e.g., PLGA 50:50 (Resomer® RG 502), PLGA 75:25 (Resomer® RG 752) and d,l-PLA (Resomer® RG 206), and from Birmingham Polymers (Birmingham, Ala.). These copolymers are available in a wide range of molecular weights and ratios of lactic acid to glycolic acid.

The most preferred polymer for use in the practice of the invention is the copolymer, poly(d,l-lactide-co-glycolide). It is preferred that the molar ratio of lactide to glycolide in such a copolymer be in the range of from about 85:15 to about 50:50.

The molecular weight of the polymeric matrix material is of some importance. The molecular weight should be high enough to permit the formation of satisfactory polymer coatings, i.e., the polymer should be a good film former. Usually, a satisfactory molecular weight is in the range of 5,000 to 500,000 daltons, preferably about 150,000 daltons. However, since the properties of the film are also partially dependent on the particular polymeric matrix material being used, it is very difficult to specify an appropriate molecular weight range for all polymers. The molecular weight of the polymer is also important from the point of view of its influence upon the biodegradation rate of the polymer. For a diffusional mechanism of drug release, the polymer is intact while the drug is released from the microparticles. The drug can also be released from the microparticles as the polymeric excipient bioerodes. By an appropriate selection of polymeric materials a microparticle formulation can be made in which the resulting microparticles exhibit both diffusional release and biodegradation release properties. This is useful in according multiphasic release patterns.

The formulation prepared by the process of the present invention may contain an active agent dispersed in the microparticle polymeric matrix material. The amount of such agent incorporated in the microparticles usually ranges from about 1 wt. % to about 90 wt. %, preferably 30 to 50 wt. %, more preferably 35 to 40 wt. %.

Other biologically active agents include non-steroidal antifertility agents; parasympathomimetic agents; psychotherapeutic agents; tranquilizers; decongestants; sedative hypnotics; steroids; sulfonamides; sympathomimetic agents; vaccines; vitamins; antimalarials; anti-migraine agents; anti-Parkinson agents such as L-dopa; anti-spasmodics; anticholinergic agents (e.g. oxybutynin); antitussives; bronchodilators; cardiovascular agents such as coronary vasodilators and nitroglycerin; alkaloids; analgesics; narcotics such as codeine, dihydrocodienone, meperidine, morphine and the like; non-narcotics such as salicylates, aspirin, acetaminophen, d-propoxyphene and the like; opioid receptor antagonists, such as naltrexone and naloxone; antibiotics such as gentamycin, tetracycline and penicillins; anti-cancer agents; anti-convulsants; anti-emetics; antihistamines; anti-inflammatory agents such as hormonal agents, hydrocortisone, prednisolone, prednisone, non-hormonal agents, allopurinol, indomethacin, phenylbutazone and the like; prostaglandins and cytotoxic drugs.

Still other suitable active agents include estrogens, antibacterials; antifungals; antivirals; anticoagulants; anticonvulsants; antidepressants; antihistamines; and immunological agents.

Other examples of suitable biologically active agents include peptides and proteins, analogs, muteins, and active fragments thereof, such as immunoglobulins, antibodies, cytokines (e.g. lymphokines, monokines, chemokines), blood clotting factors, hemopoietic factors, interleukins (IL-2, IL-3, IL-4, IL-6), interferons ($\beta$-IFN, $\alpha$-IFN and $\gamma$-IFN), erythropoietin, nucleases, tumor necrosis factor, colony stimulating factors (e.g., GCSF, GM-CSF, MCSF), insulin, enzymes (e.g., superoxide dismutase, tissue plasminogen activator), tumor suppressors, blood proteins, hormones and hormone analogs (e.g., growth hormone, adrenocorticotropic hormone and luteinizing hormone releasing hormone (LHRH)), vaccines (e.g., tumoral, bacterial and viral antigens); somatostatin; antigens; blood coagulation factors; growth factors (e.g., nerve growth factor, insulin-like growth factor); protein inhibitors, protein antagonists, and protein agonists; nucleic acids, such as antisense molecules; oligonucleotides; and ribozymes. Small molecular weight agents suitable for use in the invention include, antitumor agents such as bleomycin hydrochloride, carboplatin, methotrexate and adriamycin; antipyretic and analgesic agents; antitussives and expectorants such as ephedrine hydrochloride, methylephedrine hydrochloride, noscapine hydrochloride and codeine phosphate; sedatives such as chlorpromazine hydrochloride, prochlorperazine hydrochloride and atropine sulfate; muscle relaxants such as tubocurarine chloride; antiepileptics such as sodium phenytoin and ethosuximide; antiulcer agents such as metoclopramide; antidepressants such as clomipramine; antiallergic agents such as diphenhydramine; cardiotonics such as theophillol; antiarrhythmic agents such as propranolol hydrochloride; vasodilators such as diltiazem hydrochloride and bamethan sulfate; hypotensive diuretics such as pentolinium and ecarazine hydrochloride; antidiuretic agents such as metformin; anticoagulants such as sodium citrate and heparin; hemostatic agents such as thrombin, menadione sodium bisulfite and acetomenaphthone; antituberculous agents such as isoniazide and ethanbutol; hormones such as prednisolone sodium phosphate and methimazole.

CONCLUSION

While various embodiments of the present invention have been described above, it should be understood that they have been presented by way of example only, and not limitation. The present invention is not limited to microparticles containing an active agent, to placebo microparticles, or to a particular active agent, polymer or solvent, nor is the present invention limited to a particular scale or batch size. Thus, the breadth and scope of the present invention should not be limited by any of the above-described exemplary embodiments, but should be defined only in accordance with the following claims and their equivalents.

What is claimed is:

1. A method for processing microparticles to improve flowability, comprising:
   (a) conditioning the microparticles to form conditioned microparticles, wherein the microparticles comprise an active agent selected from the group consisting of risperidone, 9-hydroxyrisperidone, and pharmaceutically acceptable salts of the foregoing, a polymer selected from the group consisting of poly(glycolic acid), poly-d,l-lactic acid, poly-l-lactic acid, and copolymers of the foregoing, wherein the conditioning is carried out by maintaining the microparticles at a conditioning temperature of about 25° C. for a period of at least about 5 days;
   (b) measuring a flowability index of the conditioned microparticles; and
   (c) if the flowability index of the conditioned microparticles is not greater than about 60, repeating step (a) until the flowability index of the conditioned microparticles is greater than about 60.

2. A method for preparing microparticles having improved flowability, comprising:
   (a) preparing an emulsion that comprises a first phase and a second phase, wherein the first phase comprises an active agent selected from the group consisting of risperidone, 9-hydroxyrisperidone, and pharmaceutically acceptable salts of the foregoing, a polymer selected from the group consisting of poly(glycolic acid), poly-d,l-lactic acid, poly-l-lactic acid, and copolymers of the foregoing, and a solvent for the polymer;
   (b) extracting the solvent from the emulsion to form microparticles; and
   (c) conditioning the microparticles to form conditioned microparticles, wherein the conditioning is carried out by maintaining the microparticles at a conditioning temperature of about 25° C. for a period of at least about 5 days;
   (d) measuring a flowability index of the conditioned microparticles; and
   (e) if the flowability index of the conditioned microparticles is not greater than about 60, then repeating step (c) until the flowability index of the conditioned microparticles is greater than about 60.

3. The method of claim 2, wherein step (b) comprises:
   (i) transferring the emulsion to a solvent extraction medium.

4. The method of claim 2, wherein step (c) is carried out in a temperature-controlled chamber.

5. The method of claim 2, wherein the solvent comprises benzyl alcohol and ethyl acetate.

6. A method for preparing microparticles having improved flowability, comprising:
   (a) preparing an emulsion that comprises a first phase and a second phase, wherein the first phase comprises an active agent selected from the group consisting of risperidone, 9-hydroxyrisperidone, and pharmaceutically acceptable salts of the foregoing, a polymer selected from the group consisting of poly(glycolic acid), poly-d,l-lactic acid, poly-l-lactic acid, and copolymers of the foregoing, and a solvent for the polymer;
   (b) extracting the solvent from the emulsion to form microparticles; and
   (c) hardening the microparticles to form hardened microparticles, wherein the hardening is carried out by maintaining the microparticles at a temperature of about 25° C. for a period of at least about 5 days;
   (d) measuring a flowability index of the hardened microparticles; and
   (e) if the flowability index of the hardened microparticles is not greater than about 60, then repeating step (c) until the flowability index of the hardened microparticles is greater than about 60.

7. The method of claim 6, wherein step (c) is carried out until a hardness of the hardened microparticles is greater than about 0.4 MPa.

8. The method of claim 1, wherein a hardness of the conditioned microparticles is greater than about 0.4 MPa.

9. The method of claim 2, wherein a hardness of the conditioned microparticles is greater than about 0.4 MPa.

10. A method for processing microparticles to improve flowability, comprising:
    (a) selecting a time period for processing the microparticles, wherein the time period is at least about 5 days, and wherein the microparticles comprise an active agent selected from the group consisting of risperidone, 9-hydroxyrisperidone, and pharmaceutically acceptable salts of the foregoing, a polymer selected from the group consisting of poly(glycolic acid), poly-d,l-lactic acid, poly-l-lactic acid, and copolymers of the foregoing;
    (b) maintaining the microparticles at a conditioning temperature of about 25° C. for the time period;
    (c) measuring a flowability index of the microparticles;
    (d) if the flowability index of the microparticles is not greater than about 60, adjusting the conditioning temperature and the time period so that the flowability index of the microparticles is greater than about 60.

11. A method for processing microparticles to improve flowability, comprising:
    (a) determining a time period for processing the microparticles, wherein the time period is at least about 5 days, and wherein the microparticles comprise an active agent selected from the group consisting of risperidone, 9-hydroxyrisperidone, and pharmaceutically acceptable salts of the foregoing, a polymer selected from the group consisting of poly(glycolic acid), poly-d,l-lactic acid, poly-l-lactic acid, and copolymers of the foregoing;
    (b) maintaining the microparticles at a conditioning temperature of about 25° C. for the time period, wherein a flowability index of the microparticles at the completion of the maintaining step is greater than about 60.

12. The method of claim 11, wherein the determining step comprises:

(i) measuring a flowability index of the microparticles;
(ii) if the flowability index of the microparticles is not greater than about 60, adjusting the conditioning temperature and the-time period so that the flowability index of the microparticles at the completion of the maintaining step is greater than about 60.

* * * * *